United States Patent Office 3,197,128
Patented July 27, 1965

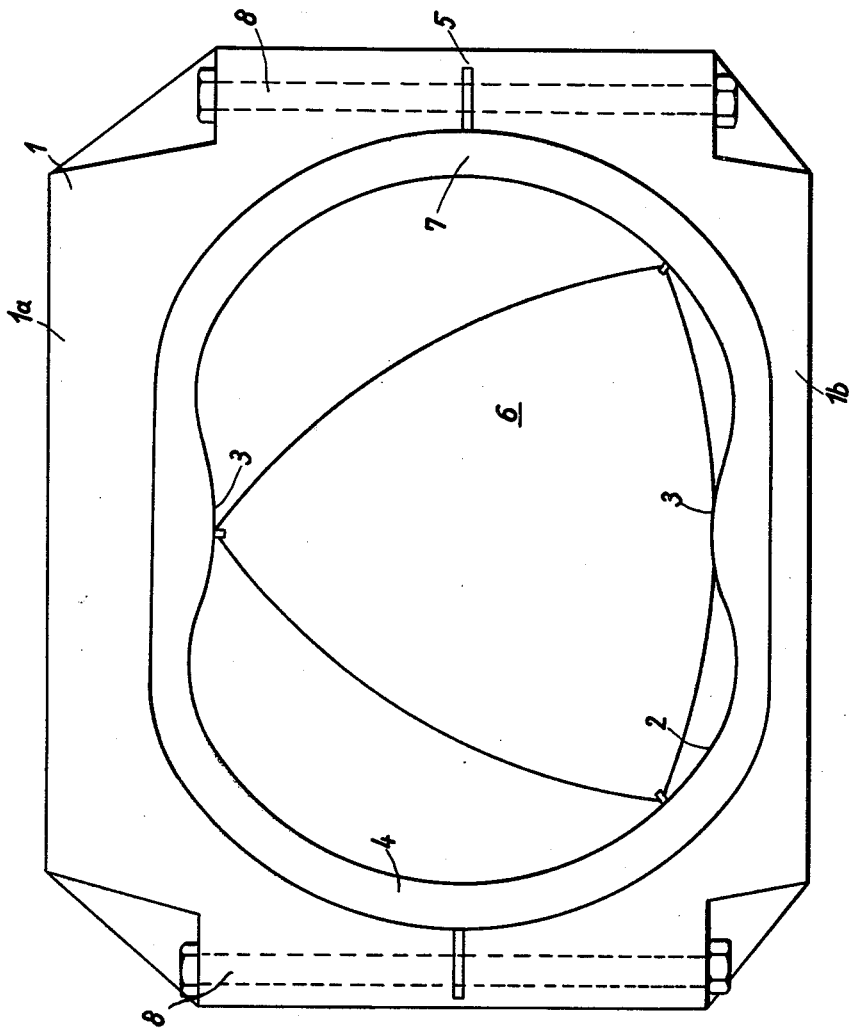

3,197,128
ROTARY PISTON MACHINE, ESPECIALLY CIRCULAR PISTON ENGINE
Johann Keylwert, Cologne-Kalk, and Georg Jungbluth, Cologne-Deutz, Germany, assignors to Klöckner-Humboldt-Deutz Aktiengesellschaft, Cologne, Germany
Filed Mar. 11, 1963, Ser. No. 264,459
Claims priority, application Germany, Mar. 13, 1962, K 46,161
8 Claims. (Cl. 230—234)

The present invention relates to a rotary piston machine, especially circular piston engine. Circular piston internal combustion engines have been known in which the inner confining surface of the outer body has the shape of an epitrochoid with two axis-near zones. The piston designed in conformity with the inner confining curve of the epitrochoid has three ridges which separate the working chambers of the machine with regard to each other. With the heretofore known circular piston internal combustion engines, the said outer or confining body is made of one single piece.

It is an object of the present invention to improve the above identified construction.

It is another object of this invention to provide an improved outer or confining body of a rotary piston machine which will make it possible to design said outer or confining body primarily with regard to its strength and rigidity only without compromises concerning the removal of heat or the deformation of the sealing means for the combustion chamber.

These and other objects and advantages of the invention will appear more clearly from the following specification in connection with the accompanying drawing illustrating an embodiment of the outer or confining body of a rotary piston machine according to the present invention.

According to the present invention, the outer or confining body which confines the rotor has inserted therein a bushing which in its turn forms the inner confining surface of the outer body for the rotor.

In order properly to mount and support the inserted bushing which is not very rigid as to form so that it can absorb the occurring gas forces, the outer or confining body is formed as a multi-sectional body. Preferably, the said outer or confining body is divided along one plane which passes through the longitudinal central axis of said outer or confining body.

In connection with the present invention there also exists the possibility of dividing said bushing. To this end, the joints of the outer or confining body and thus of the bushing may be arranged in one and the same plane.

If the inner confining surface in conformity with an epitrochoid is provided with two axis-near zones, the joint or parting line of outer or confining body and bushing may be located in the direction of the major axis of the epitrochoid.

Referring now to the drawing in detail, the structure shown therein represents the outer or confining body 1 of a circular piston internal combustion engine, the inner confining surface 2 of which is designed in conformity with an epitrochoid and has two axis-near zones 3. The inner confining surface is formed by a bushing 4 inserted into the outer body 1. According to the present invention, the said outer body 1 is designed as a multi-sectional body and accordingly has a parting line or joint 5. This joint 5 extends in the direction of the major axis 6 of the epitrochoid curve of the inner confining surface 2. The bushing 4 may be divided in the same manner as the outer body 1. In this connection it is advantageous to locate the parting line 7 in the same plane in which the parting line 5 of the outer body 1 is located. The two sections 1a and 1b of the outer body 1 are connected to each other by means of bolts 8.

It is advantageous to arrange the parting line of the bushing 4 at an angle or incline to the generatrix of the epitrochoid or to provide the sections of the bushing 4 with interengaging portions or to make the parting line serpentine-shaped. In this way, the sealing strips at the corners of the rotor will smoothly pass over the dividing gap of the bushing 4.

The fitting line for the bushing 4 within the outer body 1 must not necessarily correspond to the contour of the inner confining surface of the bushing but may deviate therefrom and have a simpler shape, as for instance more or less oval, or it may even have the shape of a cylinder.

As will be evident from the above, the arrangement according to the present invention makes it possible to design the outer body of the rotary piston machine without the necessity of compromises with regard to the heat withdrawal or the deformation of the sealing means for the combustion chamber. Furthermore, by means of the arrangement according to the invention, the inserted bushing can easily be so mounted and supported that deformations will for all practical purposes not be caused by the gas forces and the heat.

It is, of course, to be understood that the present invention is, by no means, limited to the particular construction shown in the drawings but also comprises any modifications within the scope of the appended claims.

What we claim is:

1. A rotary piston machine having a housing, a bushing inserted in said housing and having an inner surface of the cross-sectional contour of an epitrochoid having a longer axis and a shorter axis transverse thereto, a rotary piston having a cross section of a spherical triangle and being rotatable within said bushing, said housing being divided into two sections along a plane passing through the longer axis of said epitrochoid and being perpendicular to the smaller axis thereof, and means extending transversely to said dividing plane and firmly interconnecting said housing sections with each other.

2. A rotary piston machine according to claim 1, in which said bushing is likewise divided.

3. A rotary piston machine having a housing, a bushing inserted in said housing and having an inner surface of the cross-sectional contour of an epitrochoid having a longer axis and a shorter axis transverse thereto, a rotary piston having a cross section of a spherical triangle and being rotatable within said bushing, said housing and said bushing each being divided into two sections along a common plane passing through the longer axis of said epitrochoid and being perpendicular to the smaller axis thereof, and means extending transversely to said dividing plane and respectively firmly interconnecting said housing sections and said bushing sections.

4. A rotary piston machine according to claim 3, in which the parting plane of the bushing is inclined to the generatrix of the epitrochoid.

5. A rotary piston machine according to claim 3, in which said bushing is along the parting plane thereof provided with protruding and recess means.

6. A rotary piston machine having a housing, a bushing fitted into said housing and having an inner surface of the cross-sectional contour of an epitrochoid having a longer axis and a shorter axis transverse thereto, a rotary piston having a cross section of a spherical triangle and being rotatable within said bushing, said housing being divided into two sections along a plane passing through the longer axis of said epitrochoid and being perpendicular to the smaller axis thereof, the surface along which said bushing is fitted into said housing differing in contour from the inner contour surface of said bushing, and means extending transversely to said dividing plane and firmly interconnecting said housing sections with each other.

7. A rotary piston machine according to claim 6, in which the outer surface of said bushing along which the latter is fitted into said housing forms a cylindrical surface.

8. A rotary piston machine according to claim 6, in which the outer surface of said bushing along which the latter is fitted into said housing is oval shaped.

References Cited by the Examiner
UNITED STATES PATENTS

| 1,167,995 | 1/16 | Hauer | 91—80 |
| 2,611,323 | 9/52 | Digney | 103—216 X |
| 2,611,534 | 9/52 | Kirkpatrick | 230—234 X |

FOREIGN PATENTS 1,133,762 11/56 France.

LAURENCE V. EFNER, *Primary Examiner.*